Aug. 9, 1932.  D. C. COONEY  1,870,711
PULLEY REMOVER
Filed June 27, 1931
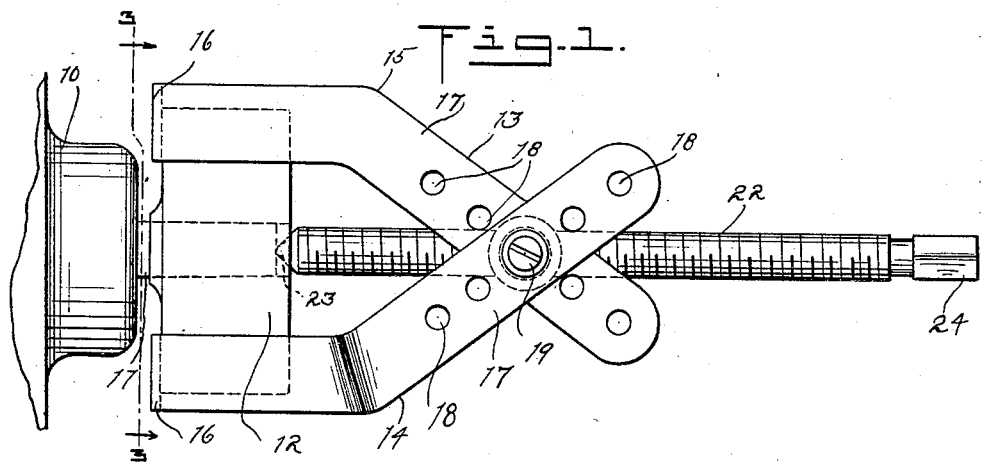
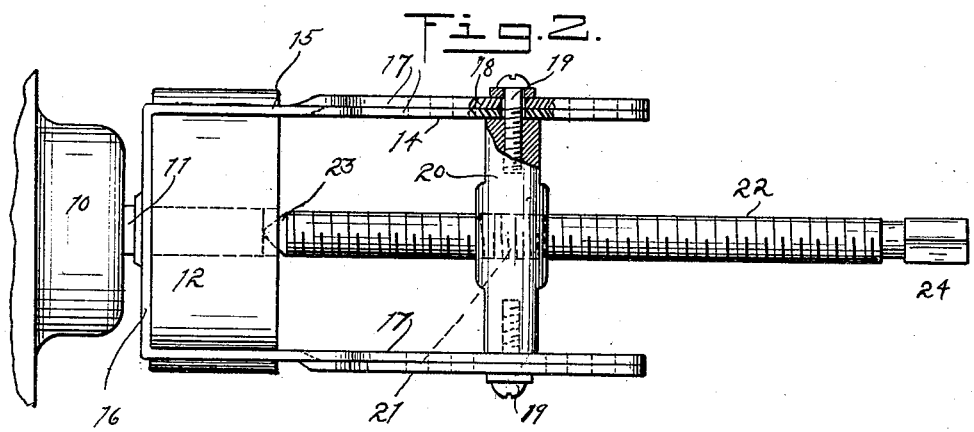
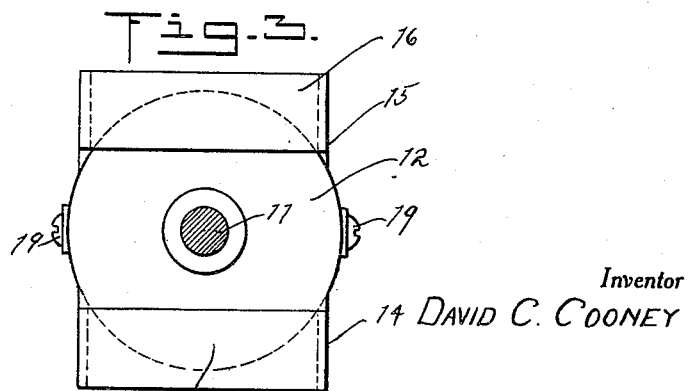
Inventor
DAVID C. COONEY
By Clarence A. O'Brien
Attorney Patented Aug. 9, 1932

1,870,711

UNITED STATES PATENT OFFICE

DAVID C. COONEY, OF EASTHAMPTON, MASSACHUSETTS

PULLEY REMOVER

Application filed June 27, 1931. Serial No. 547,392.

This invention relates to improvements in pulley removers.

The primary object of the invention resides in a device for pulling a pulley, gear, or wheel from its shaft without causing injury to the element so removed. I appreciate that many types of remover instruments have been constructed for this purpose, but they have not proven satisfactory for removing a fibre or wood pulley from a shaft due to the soft nature of the material from which it is constructed and which renders the pulley liable to damage by skipping, breaking, or marring. As above stated, my remover instrument is intended to overcome these objections.

Another object of the invention is to provide a pulley remover which may be adjusted to fit pulleys of various diameters, and which exerts an even pull upon opposite sides of the axis of the pulley so as to prevent binding between the pulley and its shaft during removal.

A further object of the invention is the provision of a pulley remover which is simple of construction, inexpensive of manufacture, and easy to operate.

With these and other objects in view, the invention resides in the certain novel construction, combination and arrangement of parts, the essential features of which are hereinafter fully described, are particularly pointed out in the appended claim, and are illustrated in the accompanying drawing, in which;

Figure 1 is a side elevational view of my improved pulley remover associated with a pulley to be removed, Figure 2 is a top plan view with a part broken away in section, Figure 3 is a vertical sectional view on the line 3—3 of figure 1.

Referring to the drawing by reference characters, the numeral 10 designates the bearing of a motor and 11 the shaft thereof on which is fixedly mounted a fibre pulley 12, the inner side of the pulley being disposed adjacent to the end of the bearing 10. Although I have specifically described a fibre pulley as being mounted upon a shaft, it will be understood that in cases where the pulley is disposed close to or adjacent a bearing, it is very difficult to remove the pulley without damage thereto and it is the purpose of this invention to provide a remover instrument which is capabale of removing the pulley from its shaft without damage thereto.

My remover instrument is designated generally by the character 13 and includes a pair of substantially U-shaped members 14 and 15 which are substantially identical in construction with the exception that one of the members is provided with offset portions so as to dispose the bight ends of the members in the same general plane.

Each of the U-shaped members include a bight portion 16 which is flat and extends across and connects the spaced angularly disposed arms 17. The arms 17 are provided with alined spaced openings 18 for facilitating the adjustment of the members in a manner to be presently explained.

The arms 17 of the U-shaped members 14 and 15 extend inwardly and cross each other with certain of the openings 18 in registration. Passing through the alined openings 18 in the arms and for securing the U-shaped members in an adjusted position, are headed screws 19, the threaded shanks of which are screwed into opposite ends of a bearing bar 20 extending transversely between the arms of the respective U-shaped members. It will be seen that by loosening the screws, the U-shaped members may be swung to various adjusted positions and by tightening the screws, the members may be held adjusted. In order to obtain other adjustments, the screws 19 may be entirely removed so as to be inserted through certain other alined openings in the arms, this adjustment depending upon the size of the pulley wheel to be removed.

The transversely disposed bearing bar 20 is provided with a central threaded opening 21 and threaded through this opening is a screw member 22, one end of which terminates in a point 23 while the opposite end is formed with a wrench engaging head 24. By turning the head 24, the screw member 22 may be moved longitudinally with respect to the U-shaped members 14 and 15.

In practice, the flat bight portions 16 of the members 14 and 15 are engaged with the inner face of the pulley 12, it being understood that the screws 19 are loosened in order to facilitate the swinging of the members behind the pulley 12. After the members 14 and 15 have been adjusted so as to be disposed at equal distance on opposite sides of the axis of the pulley wheel, the screws are tightened, after which the screw member 22 is turned to cause the pointed end 23 to bear against the axial center of the shaft 11 at the outer end thereof.

After the pointed end 23 of the screw member 22 abuts the outer end of the shaft 11 and upon further turning of the screw member 22, an outward pull will be exerted upon the pulley 12 by the bight ends 16 of the members 14 and 15. This pull is evenly distributed on opposite sides of the axis of the wheel whereby the pulley wheel will slide outwardly of the shaft and eventually be moved free of the shaft. By applying this even pressure to opposite sides of the axial center of the wheel, there will be no binding between the pulley and its shaft during removal of the pulley. Furthermore, the bight portions 16 of the members 14 and 15 flatly engage the inner face of the pulley and do not dig into the same. This prevents marring or skipping of the pulley during the removing operation.

While I have shown and described what I deem to be the most desirable embodiment of my invention, I wish it to be understood that various changes in construction may be resorted to if desired as come within the scope of the appended claim.

Having thus described the invention, what is claimed as new and what it is desired to secure by Letters-Patent of the United States, is:

A pulley remover comprising a pair of U-shaped members, each of said members embodying a bight portion and a pair of spaced arms having angularly extending portions provided with longitudinally spaced openings and the angularly extending portions of the arms of said U-shaped members crossing each other, the angularly extending portions of the arms of one of said U-shaped members being offset to dispose said bight portions in the same plane, a bearing bar, screws freely passing through alined openings in said arms and threaded into the ends of said bearing bar, and a screw member threaded in said bearing bar centrally thereof.

In testimony whereof I affix my signature.

DAVID C. COONEY.